(12) United States Patent
Ward

(10) Patent No.: US 9,457,969 B2
(45) Date of Patent: *Oct. 4, 2016

(54) CONTAINER TILTING APPARATUS

(71) Applicant: Simon Robert Ward, Meadowbank, IL (US)

(72) Inventor: Simon Robert Ward, Meadowbank, IL (US)

(73) Assignee: A WARD ATTACHMENTS LIMITED, Manukau, Auckland (NZ)

( * ) Notice: Subject to any disclaimer, the term of this patent is extended or adjusted under 35 U.S.C. 154(b) by 58 days.

This patent is subject to a terminal disclaimer.

(21) Appl. No.: 14/265,329

(22) Filed: Apr. 29, 2014

(65) Prior Publication Data

US 2015/0016929 A1 Jan. 15, 2015

Related U.S. Application Data

(63) Continuation of application No. 12/302,501, filed as application No. PCT/NZ2007/000126 on May 25, 2007, now Pat. No. 8,708,633.

(30) Foreign Application Priority Data

May 26, 2006 (NZ) ........................................ 547544

(51) Int. Cl.
   *B65G 65/23* (2006.01)
   *B65G 67/40* (2006.01)
(52) U.S. Cl.
   CPC .............. *B65G 65/23* (2013.01); *B65G 67/40* (2013.01)
(58) Field of Classification Search
   CPC ....... B65G 65/23; B65G 67/30; B65G 67/40
   USPC ....... 414/354, 362, 385, 386, 391, 419, 425, 414/447, 575, 577, 582, 583
   See application file for complete search history.

(56) References Cited

U.S. PATENT DOCUMENTS

| 375,911 | A | 1/1888 | Aber |
| 2,576,048 | A | 11/1951 | Schum |
| 2,603,366 | A | 7/1952 | Adams |
| 2,603,501 | A | 7/1952 | Graves |
| 2,638,236 | A | 5/1953 | Prowinsky et al. |
| 2,714,461 | A | 8/1955 | Walker |
| 2,748,962 | A | 6/1956 | Murray |
| 2,786,586 | A | 3/1957 | Hague et al. |
| 2,870,928 | A | 1/1959 | Haggard et al. |
| 4,095,708 | A | 6/1978 | Gerhard |
| 4,213,728 | A | 7/1980 | McKenzie |
| 4,421,448 | A | 12/1983 | Sonnenberg |

(Continued)

FOREIGN PATENT DOCUMENTS

| AU | 759428 B2 | 8/2000 |
| FR | 2785969 | 5/2000 |

(Continued)

*Primary Examiner* — James Keenan
(74) *Attorney, Agent, or Firm* — The Thompson Law Office, P.C.; Lawrence E. Thompson

(57) ABSTRACT

The present invention relates to a container tilting apparatus which includes at least one base section, and at least two tilt arms, with each of the tilt arms being pivotably connected to a base section. The tilt arms may be configured to engage different portions of the container. Also included is at least one tilt arm drive configured to pivot a tilt arm relative to a base section. The apparatus is arranged so that at least one tilt arm is pivotably connected to a base section at a point offset from the center of the tilt arm.

4 Claims, 11 Drawing Sheets

(56) References Cited

U.S. PATENT DOCUMENTS

| | | |
|---|---|---|
| 4,447,185 A | 5/1984 | Robinson et al. |
| 5,755,816 A | 5/1998 | Schirmer et al. |
| 6,027,297 A | 2/2000 | Dungan |
| 6,565,308 B2 | 5/2003 | Derby et al. |
| 6,913,431 B2 | 7/2005 | Lilley |
| 2001/0012482 A1 | 8/2001 | Vezina |
| 2005/0281652 A1 | 12/2005 | Riley et al. |
| 2007/0065260 A1 | 3/2007 | Chapman |
| 2009/0191036 A1 | 7/2009 | Cooper |

FOREIGN PATENT DOCUMENTS

| | | |
|---|---|---|
| GB | 2269374 A | 2/1994 |
| GB | 2296701 A | 7/1996 |
| NZ | WO/01/05692 | 1/2001 |
| WO | WO/93/17951 A1 | 9/1993 |

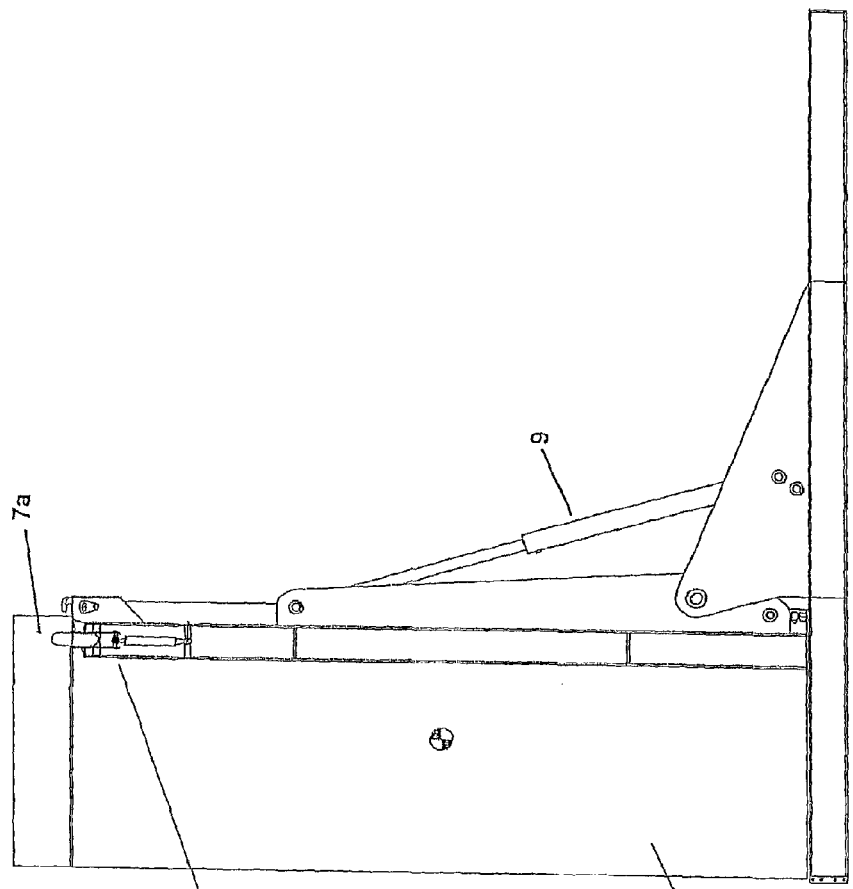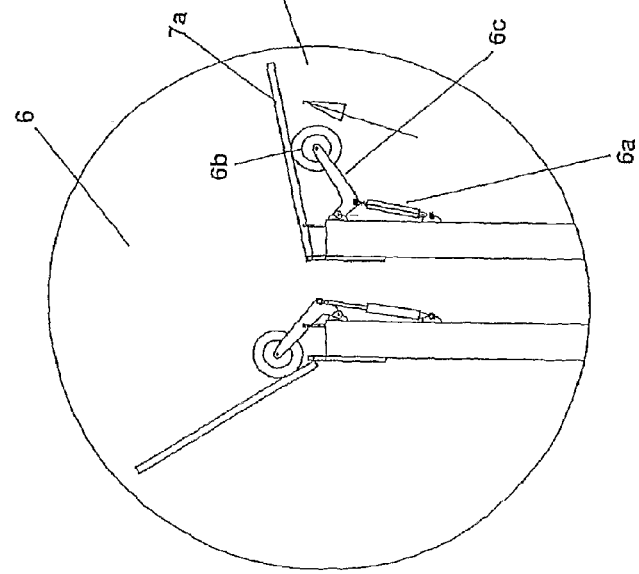

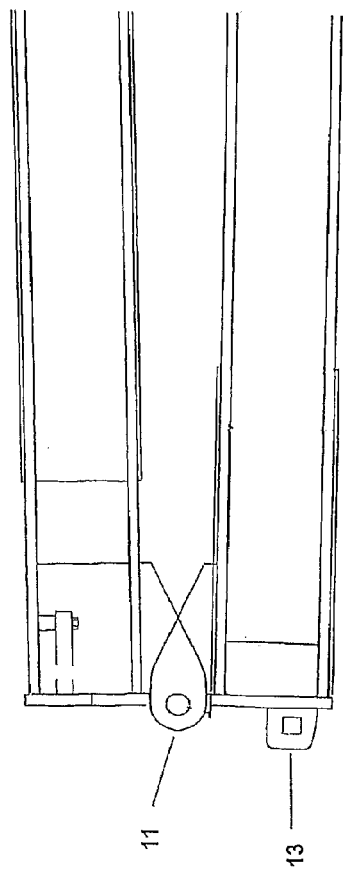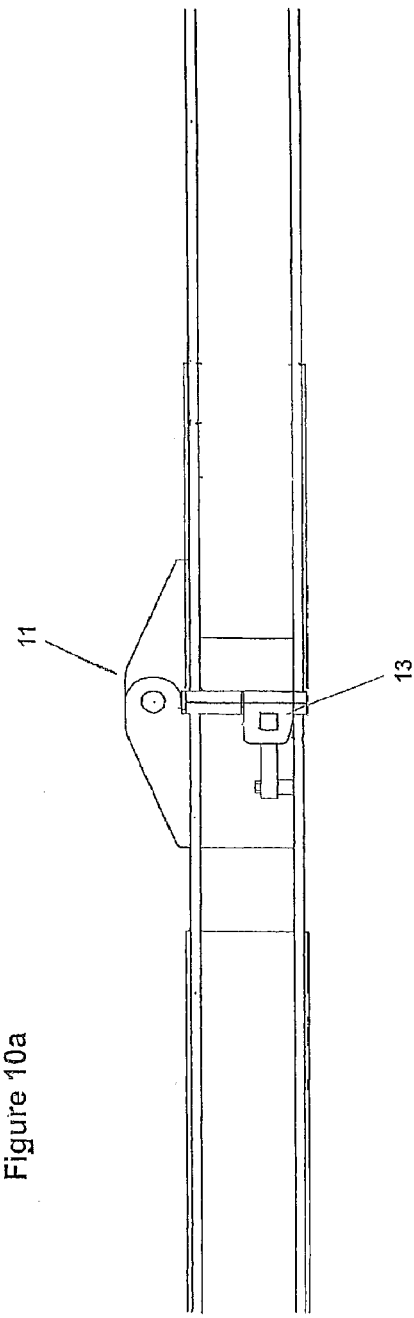

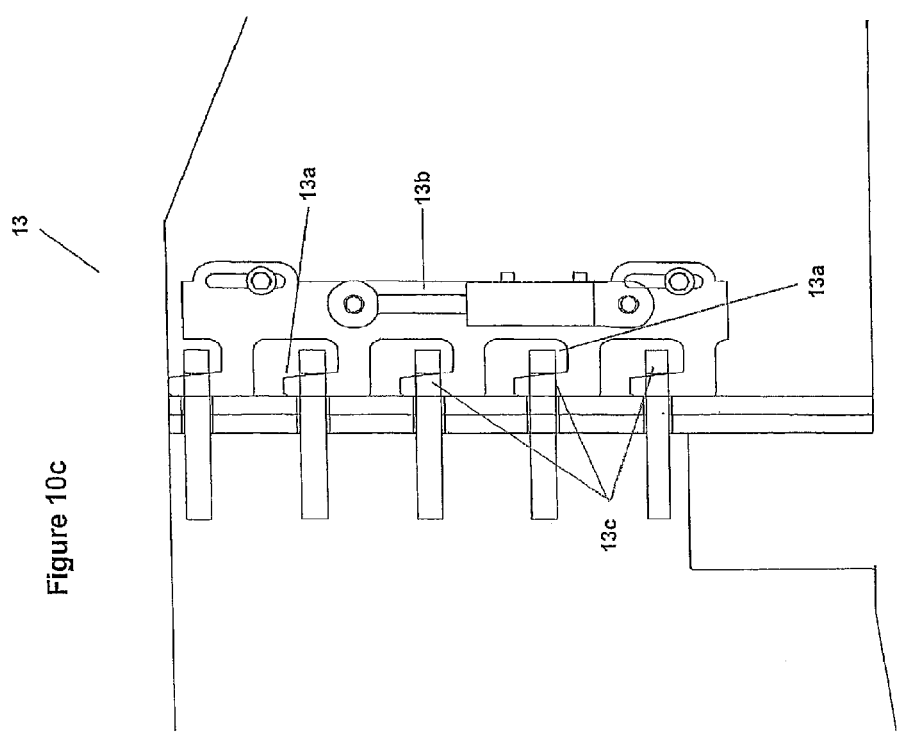

CONTAINER TILTING APPARATUS

CROSS REFERENCE TO RELATED APPLICATIONS

This application is a continuation of U.S. patent application Ser. No. 12/302,501 which is the national phase application of International Application PCT/NZ2007/000126 filed on May 25, 2007 which, in turn, claims priority to New Zealand Application 547544 filed on May 26, 2006, the entire disclosures of each are hereby expressly incorporated herein by reference.

BACKGROUND

1. Field

This invention relates to a container tilting apparatus. In particular this invention may be adapted to allow truck or trailer units to be driven into the apparatus, allowing the invention to engage the side walls of a container to lift and tilt the container for a gravity driven loading or unloading operation. However, those skilled in that art should appreciate that in other instances the present invention may not necessarily be configured to work directly with truck or trailer units.

2. Background

Standard dimension containers are used for transporting numerous types of materials. Shipping containers in particular are formed with a fixed height and width but with lengths between 20 or 40 feet. The transport industry uses a significant amount of infrastructure to handle and transport these standard size shipping containers.

To utilize a container efficiently as much of the cubic volume of the container should be filled. This can be problematic when particulate materials or large numbers of small articles are to be loaded through the front door of a container. This can result in heaps or piles of material collecting inside the container which do not easily reach the container ceiling and hence does not maximize the use of the whole volume of the container.

For particulate materials or other types of loads which could be poured, it is preferable to tip the container to facilitate a gravity fed loading operation. Tipping a container allows materials to be poured into it and fill the container efficiently.

Furthermore, such particulates or pourable materials can also be unloaded from a container through a gravity driven unloading operation if the container is tilted.

Such containers may be quickly unloaded when their rear doors are open and the container is tilted.

However tilting shipping containers is a difficult operation due to the size of such containers and their final weight once loaded. It is possible to tip a shipping container using a forklift acting on the front open end of a container. However this is a slow and unstable process requiring a large, expensive and high capacity forklift. Furthermore such forklifts are limited with respect to the maximum angle to which they can tilt a container.

It is also possible to tilt a container through the use of cranes or articulated lifting arm systems. Container lifting arms have been developed to lift and lower containers from the beds of trucks or similar vehicles. However, these systems are focused towards only displacing a container sideways and down to unload a container or the reverse operation to load a container onto a truck or trailer bed. Cranes do have the potential to lift one end of a container, allowing the opposite end to swing freely in the air as the container is lifted. As can be appreciated by the skilled in the art, this is a dangerous operation as gusts of wind or knocks to the container may cause it to swing around wildly.

It would be preferable to have a container tilting apparatus which addressed any or all the above problems. In particular a container tilting apparatus which could tilt a container to a high angle of inclination both safely and quickly would be of advantage.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term "comprise" may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term "comprised" or "comprising" is used in relation to one or more steps in a method or process.

It is an object of the present invention to address the foregoing problems or at least to provide the public with a useful choice.

Further aspects and advantages of the present invention will become apparent from the ensuing description which is given by way of example only.

DISCLOSURE OF THE INVENTION

According to one aspect of the present invention there is provided a container tilting apparatus which includes, at least one base section, and at least two tilt arms, each of said tilt arms being pivotably connected to a base section, and at least two container locks, each container lock being configured to engage a tilt arm with a side wall of a container, and at least one tilt arm drive configured to pivot a tilt arm relative to a base section, wherein said at least one tilt arm is pivotably connected to a base section at a point offset from the centre of said tilt arm.

According to a further aspect of the present invention there is provided a method of tilting a container, characterized by the steps of: i) positioning a container between two opposed tilt arms, and ii) tilting the rear end of said tilt arms downwards and the front end of the tilt arms upwards, and iii) engaging the rear ends of the tilt arms with the side walls of the container using two rear container locks, and iv) tilting the rear ends of the tilt arms upwards and the front ends of the tilt arms downwards, and v) engaging the front ends of the tilt arms with the side walls of the container using a pair of front container locks, and vi) raising the front ends of the tilt arms and lowering the rear ends of the tilt arms to tilt the container engaged with the tilt arms.

According to a further aspect of the present invention there is provided a method of tilting a container characterized by the steps of: i) positioning a container between two opposed tilt arms, and ii) tilting the rear ends of the tilt arms upwards and the front ends of the tilt arms downwards, and iii) engaging the front ends of the tilt arms with the side walls of the container using a pair of front container locks, and iv) tilting the rear end of said tilt arms downwards and the front end of the tilt arms upwards, and v) engaging the rear ends of the tilt arms with the side walls of the container using two rear container locks, and vi) raising the front ends of the tilt arms and lowering the rear ends of the tilt arms to tilt the container engaged with the tilt arms.

The present invention is adapted to provide a container tilting apparatus. This apparatus may be used to engage with a container and to tilt this container so its open front end is elevated. Tilting a container allows materials to be poured or dropped directly into the container. Furthermore, such loaded containers may also be quickly unloaded through again tilting the container and letting its contents run from doors opened in its bottom end. The front of the container may be elevated through a tilting operation by pivoting the front end of the container upwards relative to its opposite end, where the front end is left open during a loading operation or the bottom end is left open during an unloading operation.

Reference in the main throughout this specification will be made to containers to be tilted using the present invention being a standard form of shipping container. However, those skilled in the art should appreciate that other types of container may also be tilted using the present invention if required, and reference to shipping containers in the main throughout this specification should in no way be seen as limiting.

Reference throughout this specification will also in general be made to the present being used to load containers by a gravity driven loading operation. However as discussed above the present invention may also be used to unload tilted containers. In such instances the apparatus provided may be elevated above an area used to receive the contents of a container, or alternatively a pit or cavity for the contents of a container may be provided below the tilting apparatus. Those skilled in the art should appreciate that such unloading operations facilitated by the present invention are also within its scope.

The tilting apparatus provided in accordance with the present invention includes at least one base section which is pivotally connected to one or more tilt arms. At least one drive arm is provided to pivot one or more of these tilt arms when engaged with a container in to turn tilt the container.

Reference throughout this specification will be made to the container tilting apparatus provided being formed from a pair of opposed assemblies, each consisting of a single base section, tilt arm and tilt arm drive. This pair of assemblies may be spaced apart from one another by approximately the width of a container to be tilted, allowing the tilt arms to grasp and engage with the side walls of a container.

Reference throughout this specification will also be made to the present invention being provided by two such substantially identical assemblies located on the left and right hand side of a container to be tilted. However, those skilled in the art should appreciate that other alternative apparatus configurations are also within scope of the present invention. For example, in one alternative embodiment a single base section only may service two tilt arms, or alternatively a single drive system may operate two tilt arms. Furthermore, in other embodiments more than two base sections and/or drive assemblies may also be provided if required.

Preferably the present invention includes at least two tilt arms which are to be engaged with the side walls of a container to be tilted. These tilt arms may provide a linkage system to allow a further drive assembly to apply a force to the container to lift the container's open front end and subsequently tilt the container.

A tilt arm may consist of a substantially straight length of material which can be placed into contact with the majority of a sidewall of a container. A tilt arm may include such a length of material in addition to a mounting sleeve or housing in which this length of material is located.

In some embodiments a tilt arm may be implemented through a two part hinged arrangement which can allow the same tilt arm to tilt two different lengths of containers. The hinged connection of these two lengths may then be used to configure the effective length of the tilt arm with either the second section of the arm folded back on the first for short containers, or extend it out in front of the first section for long containers.

In other embodiments, tilt arms with adjustable effective lengths may also be provided without the hinge based arrangement discussed above. For example, a hydraulically driven telescopic or extending arm may be provided which can have a range of effective lengths. Those skilled in the art should appreciate that a range of tilt arm configurations are available for use with the present invention.

In such hinged embodiments a tilt arm may also include a hinge lock and arm support system used to ensure that the second section of the arm is secured in the correct orientation during use of the tilting apparatus. Such systems may preferably be configured so that the hinge may only be used to adjust the relative positions of the two sections of the tilt arm when an arm is lowered to lie substantially horizontal to the ground. This configuration will minimize the loading forces applied on the apparatus when the second end of the tilt arm is pivoted out to its side. In such instances a further support post or pin may be engaged with the hinged end of the first section of the arm to support the weight of the second arm section as it is pivoted around.

In a further preferred embodiment each of the tilt arms may be linked together at their bottom or rear ends by a transverse cross member. This cross member may act to balance or synchronize the tilting action of both the tilt arms when operated.

Preferably each tilt arm provided may be pivotally connected to a base section. In such instances the base section may provide a stable platform or foundation for a tilt arm.

A base section may be permanently mounted to a support surface, such as for example, a flat section ground, roadway, tarmac or concrete which readily allows a container to be positioned between two tilt arms.

Preferably a base section may also form or define a wheel guide. In such embodiments a pair of base sections may be disposed at the edges of an area which a truck or trailer unit may be driven into. The base sections provided on either side of this area may be used to guide the motion of a vehicle or its trailer into alignment with the tilt apparatus's tilt arms. In a further preferred embodiment a base section may form or define a side wall which extends up from the surface on which a vehicle's wheels are to run, trapping the vehicles wheels between the side walls defined by two opposed base sections.

Reference throughout this specification will also be made to the container tilting apparatus provided receiving a container from the bed of a truck or trailer unit. However those skilled in the art should appreciate that other types of vehicles may also be employed to deliver a container to or receive a container from the tilting apparatus.

For example, in one alternative embodiment a container may be received from or delivered to the bed of a railway carriage. Such carriages may be shunted between the tilt arms of the apparatus where tracks on which the carriage runs can eliminate the need to use a base section to define a wheel guide.

Furthermore, in other alternative embodiments the tilting apparatus may be configured to receive a container from or deliver a container to a forklift or fork hoist. Preferably a container may be delivered to or received from a hoist positioned to one side of a tilt arm. In such embodiments a hollow or recess may be formed in at least one of the tilt arms which allows the loading forks of the hoist to be dropped down into the tilt arm when supporting a container. This will allow the bottom surface of a container to lie at substantially the same position as which it would normally sit when located on a truck, trailer or railway carriage bed. At this stage the tilt arms may then be engaged or disengaged from the side walls of the container to unload or load the container onto the hoist forks.

Those skilled in the art should also appreciate that a single implementation of the tilting apparatus provided may be configured to work with a range of different types of vehicles. For example, in some embodiments rail lines may run into the tilt apparatus, where this apparatus may also include wheel guides, and also a recess in one or more of the tilt arms to accommodate the forks of a fork hoist or lift. Alternatively, different implementations may be provided to service only one type of vehicle if required.

In a preferred embodiment a tilt arm may include a pivoting connection to a base section displaced from both ends of the tilt arm. By displacing the pivot connection of an arm from its ends, this allows substantially the same components to be employed to form a container tilting apparatus which can deal with different lengths of containers. For example, in a preferred embodiment the present invention may be configured to tilt either 20 ft or 40 ft long containers. In such instances either 20 ft or 40 ft long tilt arms may then be selected to engage with a side wall of a container where the remaining components of the apparatus remain the same.

Preferably each tilt arm is pivotably connected to a base section at a point offset from the centre of the tilt arm. This centre offset pivot of each tilt arm allows for high container tilting angles to be achieved without requiring both of the tilt arms to be lifted to give ground clearance to the bottom of a tilted container.

Preferably the height of a tilt arm's pivotal connection to a base section above the support surface used to support the base section is greater than the distance between the pivoting connection and the rear end of the tilt arm. In such embodiments the rear end of a tilt arm may be the end of the arm closest to the arms pivoting connection to a base section, where this rear end is lowered when a container is tilted upwards. By having the height of this pivoting connection greater than the remaining rear end length of the tilt arm, sufficient ground clearance is provided for a container to be tilted through to a maximum of ninety degrees from an initial horizontal orientation.

Preferably the pivotable connection between a tilt arm and base section is stationary during the tilting of a container. In this configuration of the invention all elements of the base remain fixed in place during operation of the apparatus in addition to the base's pivotable connection to a tilt arm. In such instances these pivotable connections to tilt arms may be defined as fixed, static or stationary pivot points which stay in the same location when a tilt arm is pivoted to tilt an engaged container.

In a preferred embodiment each tilt arm may be directly connected or coupled to a base section. This arrangement of the container tilting apparatus minimizes the number of individual components and connection points which may fail under load as a container is tilted. By directly coupling a tilt arm to abuse section using single pivoting connection this provides a robust and strong design for the apparatus. Furthermore, in combination with the centre offset pivot connection point of tilt arms, the direct connection of a tat arm to a base section allows for the provision of a single pivot point in the apparatus while still allowing adequate ground clearance to tilting containers.

Preferably the container tilting apparatus provided includes at least two container locks. Each of these container locks can be configured to engage a tilt arm with a side wall of a container. This arrangement of container locks allows a container on a truck or trailer bed to be driven between each of the tilt arms, with these arms subsequently being engaged with the side walls of the container to enable the tilt arms to lift and tilt the container.

In a further preferred embodiment each tilt arm may be associated with or include a pair of container locks, being a front lock and a rear lock. The front lock may engage with the front end of a container's side wall adjacent to a door through which the container is loaded. Conversely, the rear container lock may engage with the opposite rear end of the container side walls. These front and rear container locks may provide four connection points across both of the tilt arms, securely locking the side walls of the container against each of the tilt arms.

In embodiments where a tilt arm is provided by a hinged two section assembly, each container tilt arm may employ a single rear lock and pair of front locks. A front lock may be associated with the end of both hinged sections of the tilt arm, allowing each of these sections to individually engage the side wall of a container adjacent to the front end of the container.

In a preferred embodiment a front lock may consist of or incorporate a pivoting hook section disposed on the front end of a tilt arm. This pivoting hook section may be pivoted into a position to lie substantially parallel to a side wall of a container which the tilt arm is to engage. Such a front lock may engage the container through the use of an L-section bolt where a short projecting end of this bolt can be located within a cavity formed in the front wall or end of the container. The main body or length of the bolt will then project out perpendicular to the container side wall and can be trapped within the hook section of the front lock. A nut component may then be threaded or screwed on to the projecting free end of this bolt to clamp the hook section firmly up against the side wall of the container.

In a preferred embodiment a rear container lock may include an alignment shaft and a separate screw clamp. This alignment shaft may project towards the rear end of the container to be engaged, and when used can project into an aperture or cavity in the rear wall of the container. This alignment shaft can be used to correctly align and position a container as it is initially moved back into the tilting apparatus. Such a rear connector may also include a screw clamp which may use a threaded shaft turned by an operator to pull a clamping surface into contact with an interior section or surface of a container side wall. This clamp arrangement may then be used to pull the rear end of a tilt arm firmly into contact with the rear end of a container side wall.

Those skilled should appreciate that the above arrangement of front and rear container locks may be employed in embodiments where containers are to be reversed or driven into the tilting apparatus starting from the front ends of the tilt arms and moving towards and finally stopping at the rear ends of the tilt arms. In such embodiments, as the container is moved back into the apparatus the container will be maneuvered onto the alignment shafts of the rear container locks.

However, in one alternative embodiment the tilting apparatus may be arranged so as to allow a container to be driven or reversed into the tilting apparatus starting from the rear ends of the tilt arms and finally stopping at the front end of the tilt arms. This arrangement may be provided to allow for variation in the positioning of a container on a vehicle bed, depending on whether the doors of the container face towards the rear of the vehicle or the front of vehicle. In such an alternative embodiment a container may be maneuvered from the rear to the front ends of the tilt arms when the container's doors face towards the rear of the vehicle used.

Furthermore, in such embodiments the arrangement or configuration of the rear container locks and front container locks may be reversed from that discussed above. In such instances a front container lock may be formed from an alignment shaft and a separate screw clamp, whereas a rear container lock may incorporate a pivoting hook disposed at the rear end of the tilt arm involved.

Preferably, and discussed above, the container tilting apparatus may include a tilt arm drive for each tilt arm employed. A tilt arm drive may be used to apply a force to a tilt arm to pivot the arm relative to a base section.

In a preferred embodiment a tilt arm drive may be provided by a hydraulic ram. Hydraulic rams can provide or apply high levels of force in a controlled manner using well known technology.

In one embodiment the tilt apparatus may also include a tilt angle indicator and a tilt angle control mechanism associated with same. This angle indicator can preferably provide information with respect to the current angle at which a container is tilted, and also may incorporate control systems which allow for adjustment in the final angle which a container is to be pivoted to.

In a preferred embodiment the tilting apparatus provided may also include a door closing mechanism. Such a door closing mechanism may be employed to close the doors of a container when held in a tilted orientation. As can be appreciated by those skilled in the art, the open end of a tilted container can be located at some height above the ground and wilt require a significant degree of manual strength to pivot an open door of the container closed through its full range of motion.

In a further preferred embodiment where a tilt arm is provided with a hinged two section configuration, a pair of door closing mechanisms may be provided, with a mechanism associated with the end of each section of the hinged tilt arm. This configuration of the tilting apparatus allows the tilt arm to close their doors of two different lengths of container irrespective of whether the hinged tilt arm is folded back on itself or fully extended.

In a further preferred embodiment a door closing mechanism may be formed by a combination of a drive ram and a pivoting contact head mounted on an angled body. Such a drive ram may act on the angled junction of this body to force the contact head into engagement with the exterior side of a door. This contact head can force the door to swing up parallel with the length of the container body, thereby allowing gravity to allow the door to fall into its closed position.

In a preferred embodiment each base section provided may also include a jack system configured to adjust the height or displacement of a base section. Such jack systems may be employed to adjust the relative height of tilt arms to different heights of truck, trailer or railway carriage beds for different applications or as used in different countries.

Preferably the container tilting apparatus provided may be configured to engage with a container which has been driven into the apparatus on the bed of a truck or trailer unit.

In such instances a truck may back a container into the apparatus using the base sections provided as wheel guides. The rear container locks may then be engaged with the container, and the tilt arms involved initially can be pivoted downwards to lift the bottom surface of the container from its supporting bed. At this stage the front container locks may then be engaged and the tilt arms pivoted back slightly to raise the entire bottom surface of the container off its supporting bed.

The truck or trailer unit involved may then be driven out of the apparatus to allow the container to be tilted to a high angle of inclination. Once the container has been tilted and loaded the opposite process may be executed, with the front locks being released first followed by the rear locks. This will then place the loaded container back on to a truck or trailer bed and allow the truck to drive off with the loaded container.

However, as discussed above those skilled in the art should also appreciate that the present invention may also work with railway carriages and forklifts or fork hoists if required. Railway carriages may be unloaded and loaded substantially the same manner as that discussed above with respect to truck or trailer units. Conversely, fork hoists may load or unload a container from the side of the apparatus provided.

The present invention may provide many potential advantages over prior art container lifting systems.

The present invention may be optimized or adapted to engage with containers supported on the bed of a truck or trailer unit. A truck can be used to drive a container into the apparatus and immediately receive a loaded container out of the apparatus once this container has been tilted for filling.

The present invention may be used to quickly and safely tilt a container to a high angle of inclination. This can in turn result in an efficient gravity fed loading operation, allowing the majority of the internal volume of the container to be filled with particulate materials of flows of other types of fluids.

Furthermore, the present invention may also be employed to allow containers to transport an increased variety of materials. For example, through the use of a lining system in the interior of the container, food materials may also be transported efficiently without the need for packaging.

The present invention may be implemented with a robust and strong design with a minimum number of pivot points between a set of tilt arms and associated base sections. By preferably directly coupling a tilt arm to a base section at a point offset from the centre of the tilt arm, containers can be tilted to high angles with adequate ground clearance underneath the container as it is pivoted.

BRIEF DESCRIPTION OF THE DRAWINGS

Further aspects of the present invention will become apparent from the following description which is given by way of example only and with reference to the accompanying drawings in which:

FIGS. 5a, 5b show the apparatus of FIG. 1 when used to tilt a container and the operation of a door closing mechanism, FIGS. 10a, 10b, 10c show components of the hinge and hinge locking system employed within the hinged two section tilt arm illustrated with respect to FIGS. 8 and 9.

BEST MODES FOR CARRYING OUT THE INVENTION

Figure 1:
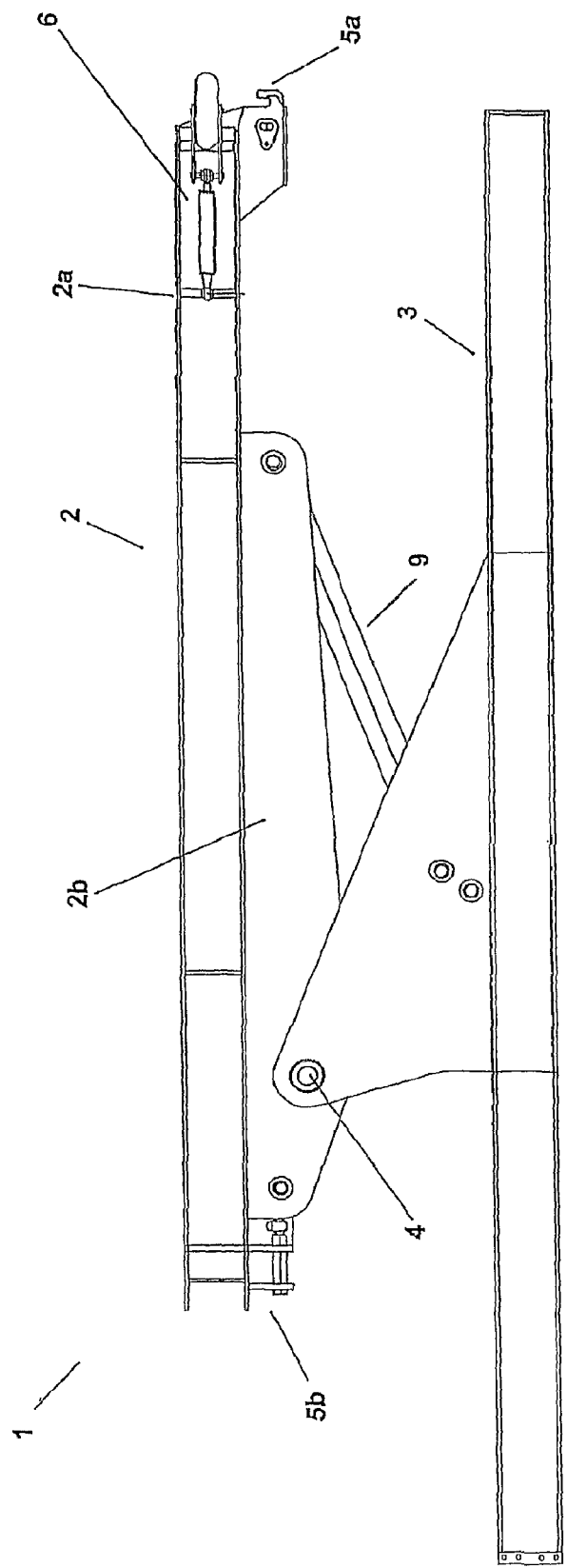
FIG. 1 shows a side view of a container tilting apparatus provided in accordance with a preferred embodiment of the present invention.

FIG. 1 shows a side view of a container tilting apparatus (1) provided in accordance with a preferred embodiment of the present invention.

The side view of the apparatus (1) shows one of two left and right handed tilting assemblies displaced by the width of a container to be tilted. Each assembly includes a tilt arm (2) pivotally mounted on a base section (3) via a pivot connection (4). The arm (2) can be tilted relative to the base section (3) by a tilt arm drive (9).

As can be seen from FIG. 1 this pivoting connection (4) of a tilt arm to a base section (3) is located offset from the centre of the tilt arm (2) and displaced from the ends of the tilt arm (2). As can also be seen from FIG. 1, a tilt arm (2) is directly connected to a base section (3) without any intermediate extension arms or additional pivoting connections. This direct coupling of these components allows for a strong robust design which is less likely to fail under load when tilting a container.

The pivoting connection (4) provides or defines a stationary, fixed pivot point for the tilt arm (2) as the pivot point (4) remains in the same place when the tilt arm (2) is pivoted to tilt an engaged container. As can also be seen in FIG. 1, the height of this pivoting connection (4) above a support surface on which the base section (3) is located is greater than the distance between the pivoting connection (4) and the rear end of the tilt arm (shown to the left hand side of the page). This arrangement of the height of the pivoting connection with respect to its distance from the rear end of the tilt arm allows the tilt arm sufficient ground clearance to pivot an engaged container from an entirely horizontal to an entirely vertical orientation.

Each tilt arm (2) is formed by a main arm section (2a) which is mounted on a support section (2b). The arm section (2a) may be swapped for a different component of a shorter or longer length depending on the length of the container to be tilted.

Associated with each end of a tilt arm (2) is a set of container locks, being a front container lock (5a) and a rear container lock (5b). As can be seen from FIG. 1, the rear end of the tilt arm (2) is shown at the left hand side of the page in association with the rear container lock (5b). Conversely, the front end of the tilt arm (2) is shown at the right hand side of the page in association with the front container lock (5a).

As is shown with respect to FIG. 1, the pivoting connection (4) is closer to the rear end of the tilt arm (2) than the front end of the tilt arm.

FIG. 1 also shows elements of a door closing mechanism (6), which is illustrated in more detail with respect to FIG. 5b.

Figure 2:
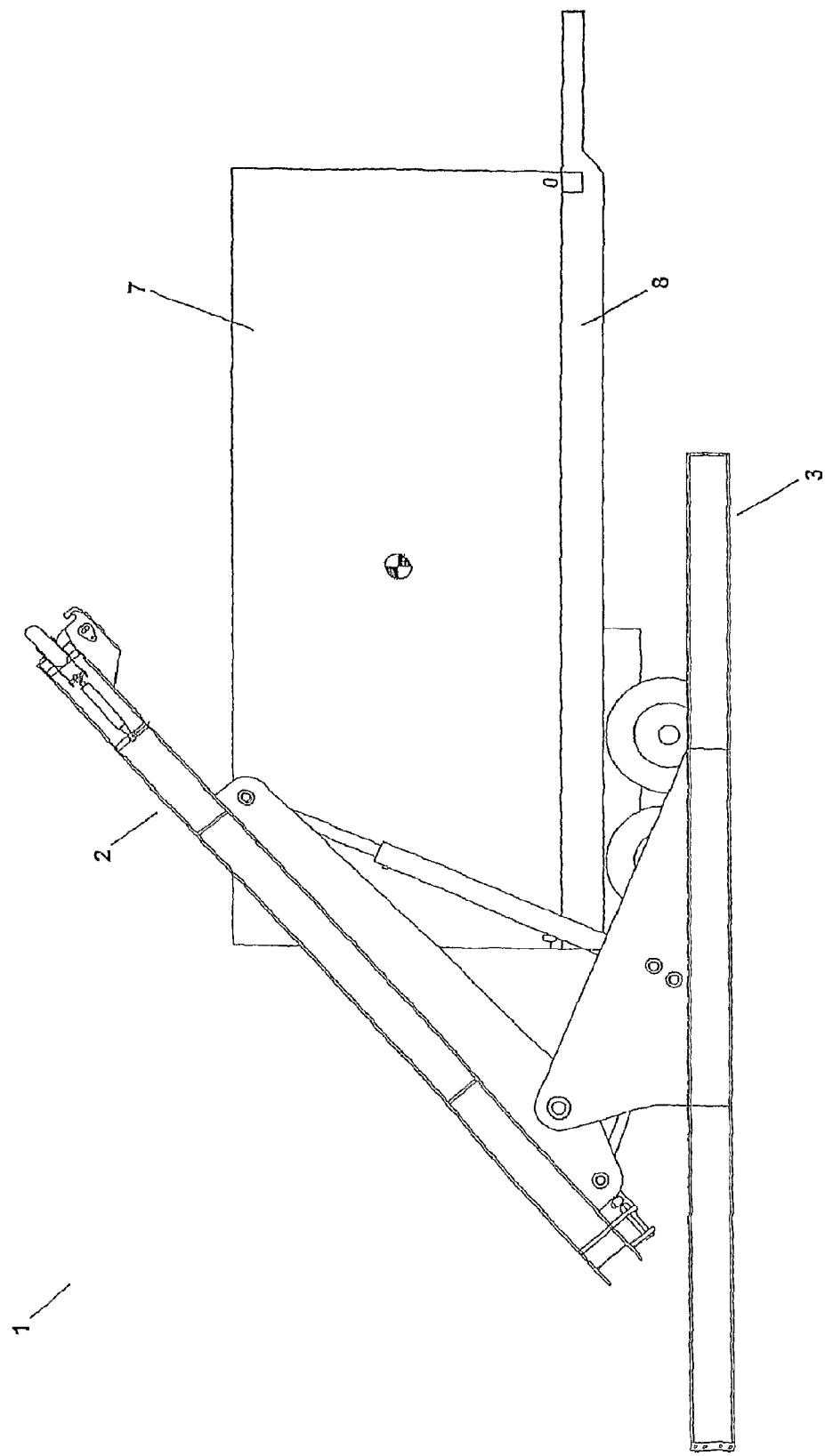
FIG. 2 shows the apparatus of FIG. 1 in the first stage of initial engagement with a container.

FIG. 2 shows the apparatus of FIG. 1 in the first stage of initial engagement with a container. At this stage a container (7) is loaded onto a trailer bed (8), and the trailer is backed into the tilt apparatus (1) between the two sets of tilt arms (2) provided.

As can also be seen from FIG. 2 each of the base sections (3) act as one of a set of wheel guides which correctly align and position the trailer and associated container (7) as it is backed into the apparatus (1).

FIGS. 3a and 3b show the next stage of this engagement process where the rear end of the tilt arm (2) is orientated downwards to allow the rear container lock (5b) to be engaged with the rear side wall of the container (7).

As can be seen more clearly from FIG. 3b the rear container lock incorporates an alignment shaft (5c) and a separate screw clamp (5d). The trailer and associated container (7) is backed on to this alignment shaft to correctly position the container within the tilting apparatus (1). Once the container is located on the shaft the screw clamp (5d) is engaged to pull the rear end of the tilt arm (2) into engagement with the rear of the container's side wall.

Figure 4:
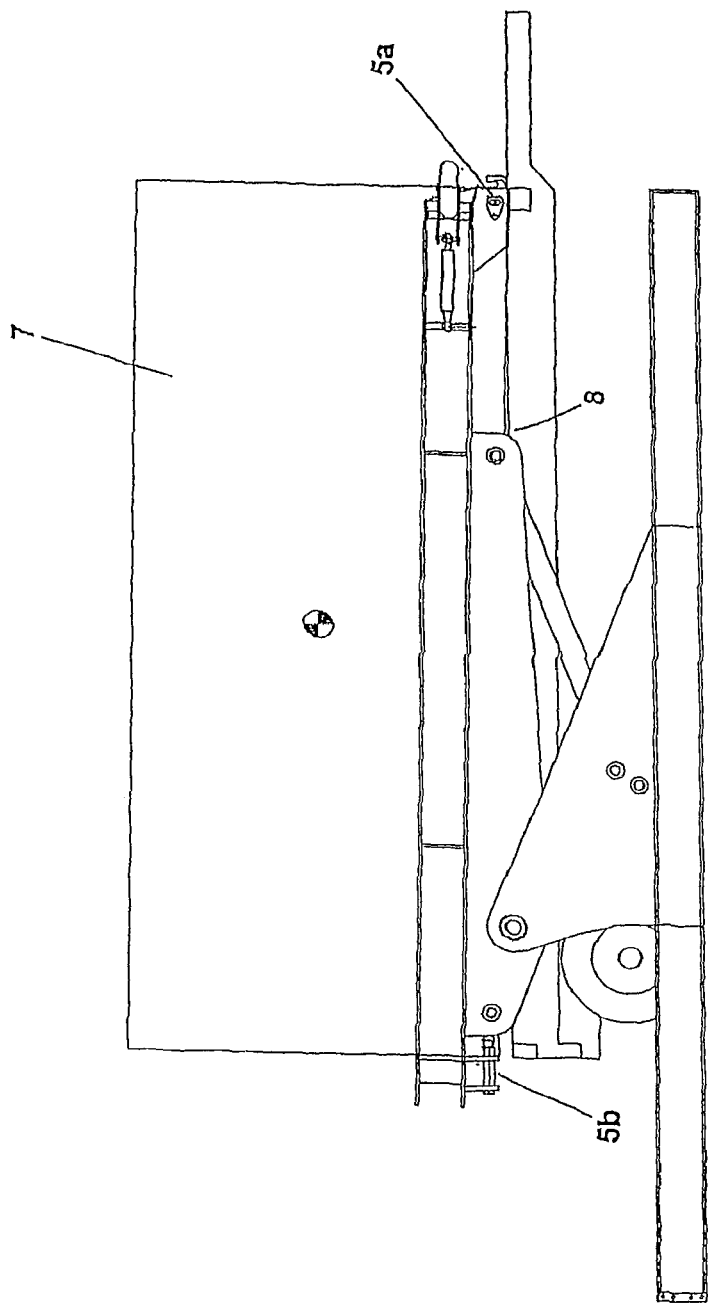
FIG. 4 shows the front container locks of the apparatus of FIG. 1 being engaged with the container.

FIG. 4 shows the next stage of the engagement process where the front container locks (5a) are next engaged with the front side wall of the container (7). At this stage the tilt arm (2) is tilted back in the opposite direction to raise the rear end of the container (7) engaged by the rear container lock (5b) off the bed of the trailer (8).

At this stage a pivoting hook section of the front lock is pivoted into alignment with the side wall of a container (7). An L-section bolt then has its short end introduced into a cavity in the front wall of the container with the remaining body of this bolt being threaded through the hook end of the front connector. A nut is then threaded onto the free end of the L-section bolt to clamp the pivoting hook surface of the connector into contact with the side wall of the container.

FIGS. 5a and 5b show the apparatus of FIG. 1 when used to tilt a container engaged by all the container locks provided. FIG. 5b also shows the arrangement and use of the door closing mechanism (6).

FIG. 5a also shows clearly the operation of the tilt arm drive (9) provided in this embodiment by a hydraulic ram system. As can be seen from FIG. 5a the tilt arm drive ram (9) is used to pivot the top open end of the container upwards and the bottom closed end of the container downwards to pivot the container through a 90 degree arc of motion. The container doors (7a) remain open during this upward lifting operation, allowing the container to be filled through a gravity fed operation.

FIG. 5b shows elements of a door closing mechanism (6) which can be used to close the container doors (7a) once the container has been filled. The door closing mechanism (6) includes a drive ram (6a) linked to a pivoting contact head (6b) via an angled body (6c). As can be seen from FIG. 5b under the action of the ram (6a) the contact head wheel (6b) can push against the exterior side of a container door (7a) to move the door to a position parallel to the main body of the container and then passed over this position to allow gravity to push the door (7a) closed.

Figure 3:
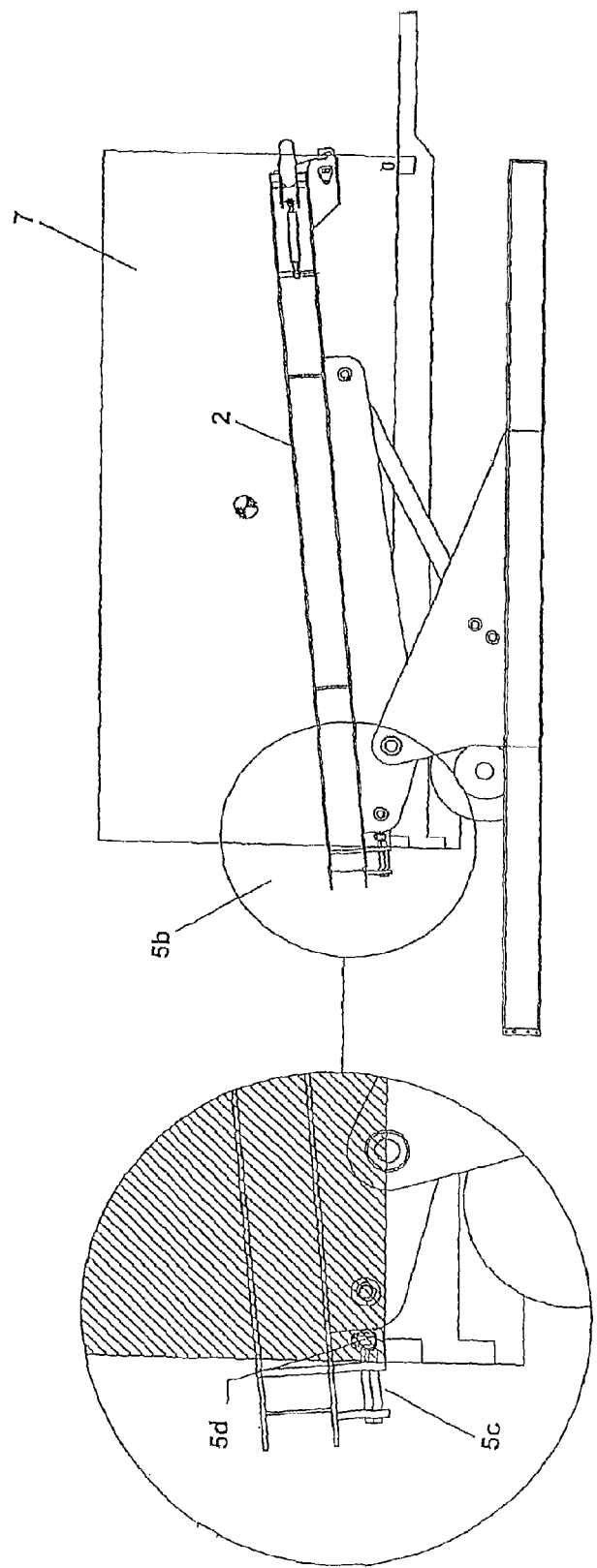
FIGS. 3a, 3b show the rear container locks of the apparatus of FIG. 1 being engaged with the container.

As can be appreciated by those skilled in the art, once the container doors (7a) are closed, the operation of the tilting apparatus (1) as discussed with respect to FIGS. 2 through 4 may then be reversed to place the container (7) back on the bed of a truck or trailer. Once the container locks have been released the truck or trailer unit may be driven out of the apparatus (1).

Figure 6:
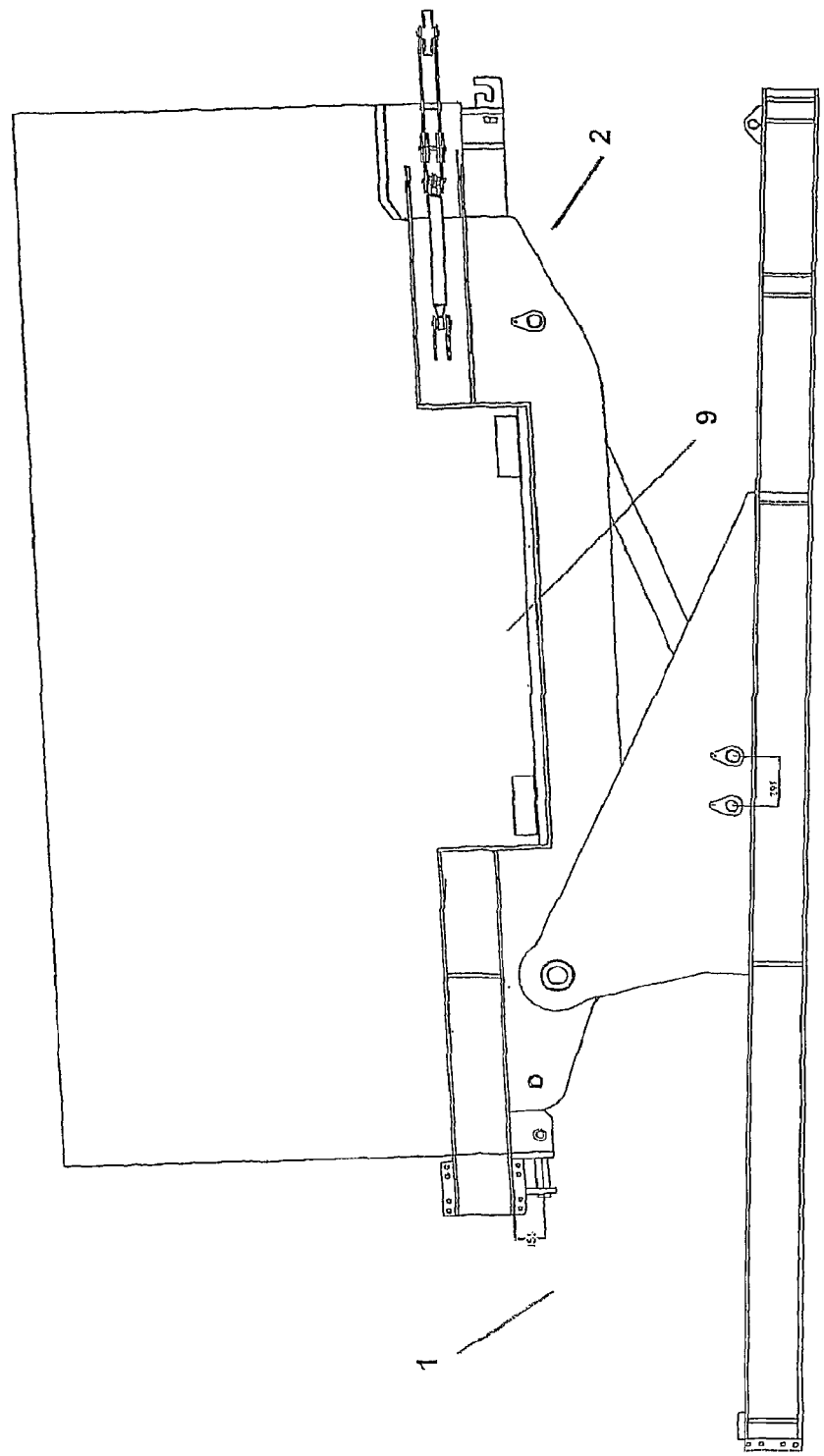
FIG. 6 shows a container tilting apparatus provided in accordance with a further embodiment which can be loaded by a forklift or fork hoist.

FIG. 6 shows a container tilting apparatus provided in accordance with a further embodiment which can be loaded by a forklift or fork hoist.

The tilting apparatus (1) illustrated with respect to FIG. 6 is essentially the same as that disclosed with respect to FIGS. 1 through 5 with the exception of the provision of a recess (9) within the tilt arm (2) shown. This recess (9) is provided to allow the tilt apparatus (1) to be loaded with a container or unloaded using a forklift or fork hoist positioned adjacent to and to one side of the apparatus.

In such embodiments the fork hoist may balance a container on its loading forks and then raise the container up and over the tilt arm shown to position the container within or between the two tilt arms. The hoist's forks may then be dropped downwards to position the container side walls between the two tilt arms, allowing the container to be engaged and for the fork hoist's forks to be removed from the recess (9).

The opposite process may then be completed when the container is to be removed from the tilting apparatus (1).

Figure 7:
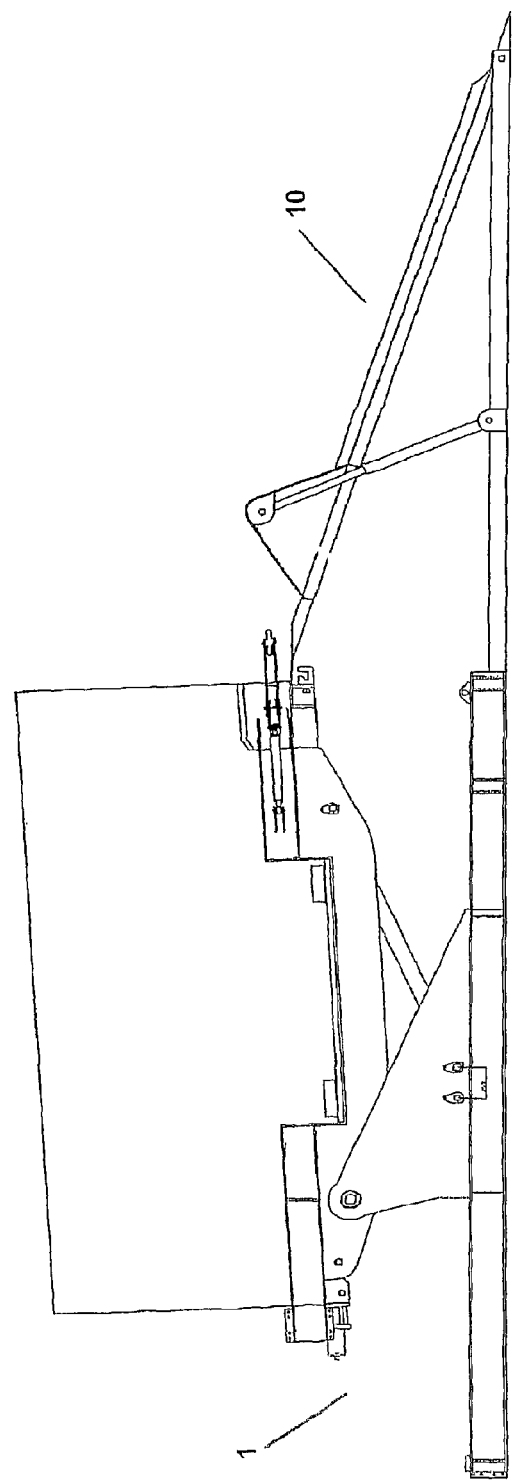
FIG. 7 shows an alternative loading ramp system used in conjunction with the tilting apparatus illustrated in FIG. 6, and FIGS. 8, 9 show side views of a container tilting apparatus configured in accordance with an additional embodiment which employs a hinged two section tilt arm assembly.

FIG. 7 shows an alternative loading ramp system used in conjunction with the tilting apparatus illustrated in FIG. 6.

In the embodiment shown a loading ramp (10) is also provided as part of the tilting apparatus (1). As can be seen from FIG. 7 this loading ramp may be used to eliminate the need for a stand alone loading dock in some applications. The container shown can be unloaded into the tilting apparatus and then the ramp (10) raised to allow material to be loaded via this ramp directly into the interior of the container.

As can be seen from FIG. 7 the container is tilted backwards slightly to ensure any loose material loaded rolls to the back of the container.

Figure 8:
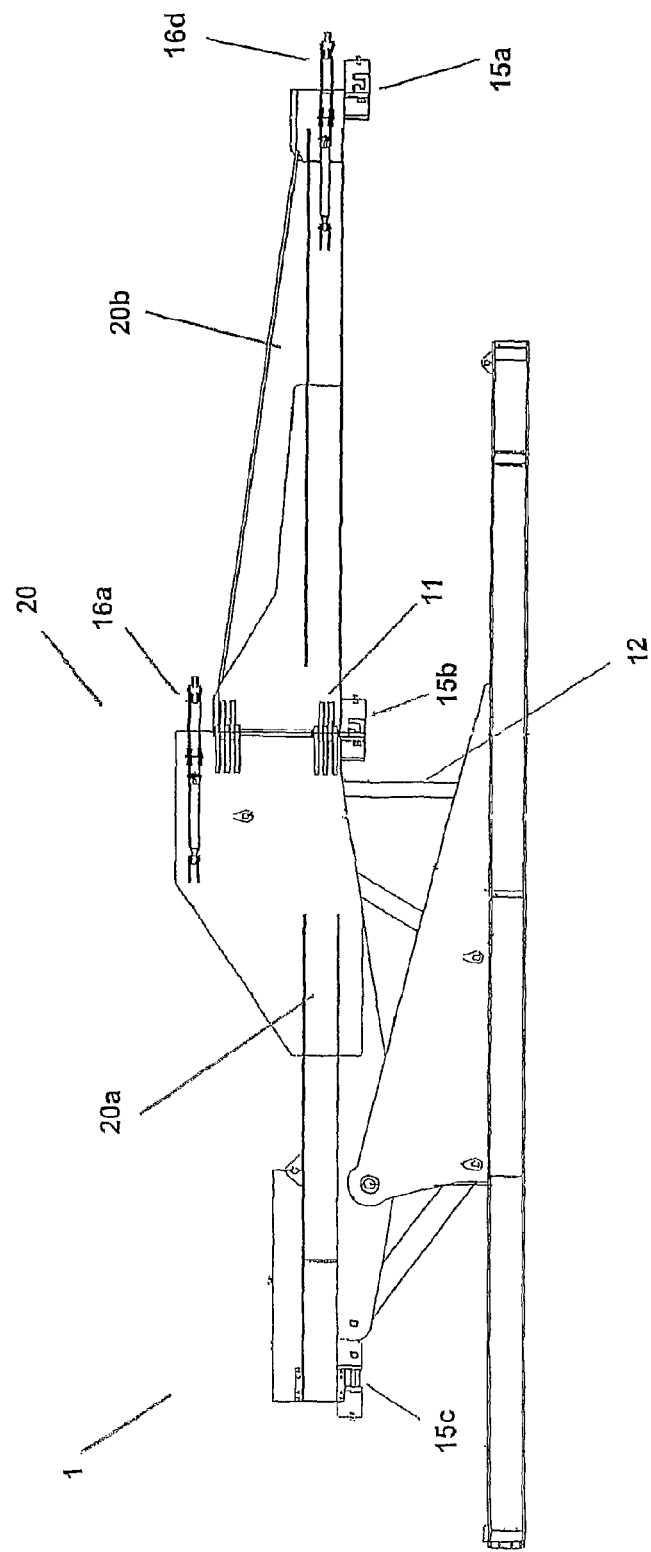
Figure 9:
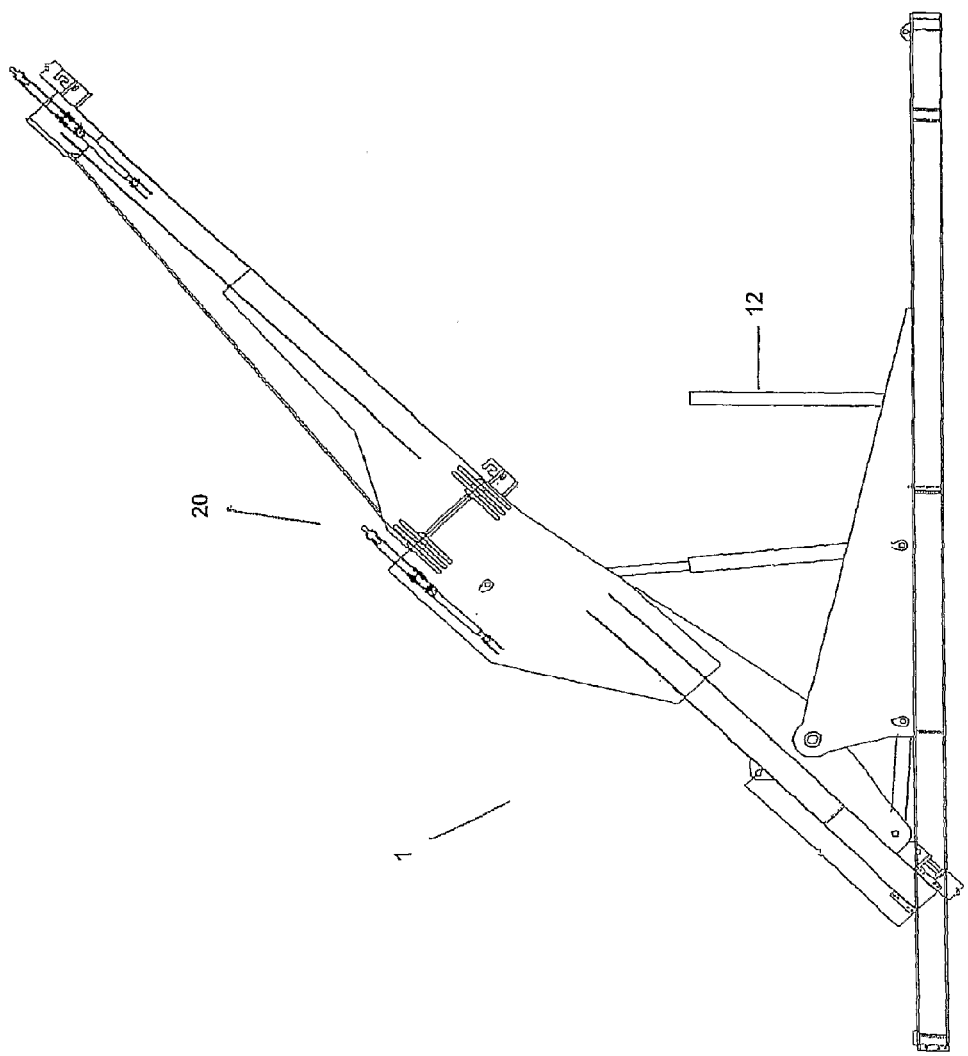

FIGS. 8 and 9 show side views of a container tilting apparatus configured in accordance with an additional embodiment which employs a hinged two section tilt arm assembly.

In the embodiment of the invention shown the tilt apparatus (1) includes a hinged two section tilt arm (20). This tilt arm includes a first section (20a) connected by a hinge (11) to a second section (20b). The projecting second section (20b) can also be supported using a support post (12) when the arm is positioned in the lowered in the configuration shown with respect to FIG. 8.

As can be seen from FIGS. 8 and 9 the two section tilt arm (20) includes a pair of front container locks (15a, 15b) and a single rear container lock (15c). The end of each section (20a, 20b) also employs its own independent door closing mechanism (16a, 16b).

FIG. 8 shows the tilt arm (20) provided in a lowered configuration whereas FIG. 9 shows the same tilt arm (20) in a raised configuration. The tilt arm is also illustrated in an extended configuration where the second section (20b) of the tilt arm is orientated to project out and away from the first section (20a). In this configuration the tilt arm may be used to engage comparatively long containers. Conversely, when short containers are to be engaged the tilt arm is lowered onto the support post (12) and a locking system associated with the hinge (11) is released. The second section (20b) may then be pivoted back towards the first section until both sections sit adjacent and parallel to one another. The second section may then be locked in place in this position and a short length container may subsequently be engaged and lifted.

FIGS. 10a, 10b and 10c show components of the hinge and hinge locking system employed within the hinged two section tilt arm illustrated with respect to FIGS. 8 and 9.

FIGS. 10a and 10b show more clearly the operation of the hinge system (11) discussed with respect to FIGS. 8 and 9. FIG. 10a illustrates the configuration of the hinge when the tilt arm is placed in the arrangement shown with respect to FIGS. 8 and 9. Conversely, FIG. 10b illustrates the arrangement of these two arm sections when folded back on one another to engage with a comparatively short container.

FIGS. 10a and 10b also show elements of a hinge locking system (13) more clearly illustrated with respect to FIG. 10c.

As can be seen from FIG. 10c a number of latch elements (13a) are linked to or associated with a drive ram (13b). These latch elements can be driven by the ram to engage with eyelet elements (13c) associated with the opposite tilt arm section.

The operation of the drive ram (13b) will then latch or unlatch this locking system to allow or prevent the hinge (11) from being operated.

Aspects of the present invention have been described by way of example only and it should be appreciated that modifications and additions may be made thereto without departing from the scope thereof as defined in the appended claims.

What is claimed is:

1. A shipping container tilting apparatus, the shipping container capable of being transported on a trailer bed, the apparatus including:
   at least one base section;
   a first and a second tilt arm, the tilt arms configured to receive the shipping container horizontally directly from the trailer bed with the tilt arms horizontal and the tilt arms configured to support the shipping container without the trailer bed, the first tilt arm including a first main arm section rigidly connected to a first support section, the second tilt arm including a second main arm section rigidly connected to a second support section;
   a first pivot directly connecting the first support section to the base section, the first pivot located beneath the first main arm section when the first main arm section is horizontal, the first pivot being stationary with respect to the base, the first pivot being offset from the center of the first tilt arm;
   the first main arm section having a first rear end and a first front end, the first rear end being closer to the first pivot than the first front end;
   a second pivot directly connecting the second support section to the base section, the second pivot located beneath the second main arm section when the second main arm section is horizontal, the second pivot being stationary with respect to the base, the second pivot being offset from the center of the second tilt arm;
   the second main arm section having a second rear end and a second front end, the second rear end being closer to the second pivot than the second front end;
   the first rear end configured to engage with a first portion of the container, and the first front end configured to engage with a second portion of the container;
   at least one tilt arm drive configured to tilt each tilt arm 90 degrees relative to a support surface used to support the base section, the tilt arm drive connected to the first support section closer to the first front end than the first rear end;

the height of the first pivot above the support surface is greater than the distance between the first pivot and the first rear end, when the container is tilted 90 degrees by the drive from the container's horizontal position when the container is received by the tilt arms; and the height of the second pivot above the support surface is greater than the distance between the second pivot and the second rear end, when the container is tilted 90 degrees by the drive from the container's horizontal position when the container is received by the tilt arms.

2. A container tilting apparatus for receiving the container from a truck and tilting the container to a vertical position, comprising:

a first base, the first base having a first leg, the first base having a first vertical riser, the first vertical riser rigidly affixed to the first leg;

a second base, the second base having a second leg, the first leg and the second leg spaced apart from each other to allow the truck to fit between the legs, the second base having a-a second vertical riser, the second vertical riser rigidly affixed to the second leg;

a first arm and a second arm rigidly secured to each other, the first arm and the second arm the same length, the first arm shorter than the first leg, the arms spaced apart from each other to allow a standard size container to fit between the arms when the arms are in a horizontal position with the arms on the exterior of opposite side walls of the container, a first support section securely and rigidly affixed to the first arm, the first support section extending toward the first leg, a second support section securely and rigidly affixed to the second arm, the second support section extending toward the second leg, a first lock and a second lock, the first lock affixed to a first end of the first arm, and the second lock affixed to a first end of the second arm, the locks configured to be secured to a corner of the container, a first door closing mechanism and a second door closing mechanism, the first door closing mechanism affixed to the second end of the first arm, and the second door closing mechanism affixed to the second end of the second arm; and a stationary pivot connecting the first vertical riser to the first support section, the pivot located between the first leg and the first arm and beneath the first arm, when the first arm is horizontal and the apparatus is receiving the container from the truck, such that the first arm may be raised from the horizontal to a vertical position while the first lock secures the container to the first arm.

3. The container tilting apparatus of claim 2, wherein the stationary pivot is closer to the first end of the first arm than the second end of the first arm.

4. The container tilting apparatus of claim 2, further including a drive arm, the drive arm connected, at a first end of the drive arm, to the base, and connected, at a second end of the drive arm, to the first support section, the drive arm being extendable to cause the rotation of the first arm around the stationary pivot connection.

* * * * *